(12) United States Patent
Kinoshita et al.

(10) Patent No.: US 7,603,035 B2
(45) Date of Patent: Oct. 13, 2009

(54) METHOD AND SYSTEM FOR A DATA CENTRIC ARCHITECTURE IN AN OPTICAL NETWORK

(75) Inventors: Susumu Kinoshita, Plano, TX (US); Ashwin Anil Gumaste, Dallas, TX (US); Olga I. Vassilieva, Plano, TX (US); Cechan Tian, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 10/933,552

(22) Filed: Sep. 3, 2004

(65) Prior Publication Data

US 2006/0051091 A1   Mar. 9, 2006

(51) Int. Cl.
 *H04J 14/02*   (2006.01)
(52) U.S. Cl. ............................... 398/59; 398/68
(58) Field of Classification Search ............ 398/59, 398/68
 See application file for complete search history.

(56) References Cited

U.S. PATENT DOCUMENTS

| | | | |
|---|---|---|---|
| 5,452,115 | A | 9/1995 | Tomioka |
| 6,204,943 | B1 | 3/2001 | Hamel et al. |
| 6,359,729 | B1 * | 3/2002 | Amoruso ............... 359/341.1 |
| 6,426,815 | B1 | 7/2002 | Koehler |
| 6,718,139 | B1 | 4/2004 | Finan et al. |
| 6,973,037 | B1 * | 12/2005 | Kahveci ................. 370/236 |
| 7,158,722 | B1 * | 1/2007 | Frigo et al. ............ 398/30 |
| 2003/0192040 | A1 | 10/2003 | Vaughan |
| 2004/0141746 | A1 * | 7/2004 | Oberg ................... 398/59 |
| 2004/0196859 | A1 | 10/2004 | Benner |
| 2004/0247318 | A1 | 12/2004 | Katsuyama et al. |
| 2004/0267602 | A1 * | 12/2004 | Gaydos et al. ........ 705/10 |
| 2005/0002671 | A1 * | 1/2005 | Smith et al. ........... 398/83 |
| 2005/0036785 | A1 * | 2/2005 | Tervonen et al. ...... 398/49 |

FOREIGN PATENT DOCUMENTS

CA   2304289 A1 * 10/2001

(Continued)

OTHER PUBLICATIONS

Maeda, M.W. "Management and control of transparent optical networks." IEEE Journal on Selected Areas in Communications, vol. 16, No. 7, Sep. 1998: 1008-1023.*

(Continued)

*Primary Examiner*—Leslie Pascal
(74) *Attorney, Agent, or Firm*—Baker Botts L.L.P.

(57) ABSTRACT

A method and system for a data centric architecture in an optical network are provided. In one embodiment, a method and system for a data centric architecture in an optical network includes an optical ring. A number of local nodes are coupled to the optical ring and are configured to receive traffic at a receiving wavelength by optically broadcasting with electrical tag discrimination. Each local node is also configured to transmit traffic at an assigned wavelength different from the transmitting wavelengths assigned to the other local nodes. The transmitting wavelengths are each transmitted at a bandwidth less than the receiving wavelength. A data center node is coupled to the optical ring and operable to receive traffic from the local nodes, sort at least some of the traffic based on the destination of the traffic, and transmit the traffic at the receiving wavelength to the destination.

20 Claims, 7 Drawing Sheets

FOREIGN PATENT DOCUMENTS

| | | |
|---|---|---|
| EP | 0 631 405 A1 | 12/1994 |
| EP | 0 668 674 A2 | 8/1995 |
| EP | 1 406 401 | 4/2004 |
| JP | 60-5696 | 1/1985 |
| JP | 5-183564 | 7/1993 |
| JP | 6-232885 | 8/1994 |
| JP | 2005-243068 | 2/2000 |
| JP | 2001-156722 | 6/2001 |
| WO | WO 02/069668 A1 | 9/2002 |
| WO | WO 02/103939 | 12/2002 |
| WO | WO 02100042 A1 * | 12/2002 |

OTHER PUBLICATIONS

Ramaswami, R. and K.N. Sivarajan. Optical Networks: A Practial Perspective. 2nd ed. San Francisco: Morgan Kaufmann Publishers, 2002.*

Shrikhande, K.V. et al. "Hornet: a packet-over-WDM multiple access metropolitan area ring network." IEEE Journal on Selected Areas in Communications, vol. 18, No. 10, Oct. 2000: 2004-2016.*

Weik, Martin A. "header" and "packet." Fiber Optics Standard Dictionary. 3rd ed. 1997.*

Communication from the European Patent Office, European Search Report for Application No. EP 05 00 2026, Nov. 9, 2006, 7 pages.

Mukai et al., "A Networkwide Backup System with Inter-Memory Autonomic Copy Mechanism," Journal Paper, vol. 34, No. 8, Aug. 2003, pp. 89-99, Systems and Computers in Japan.

Elrefaie, "Multiwavelength Survivable Ring Network Architecture," IEEE International Conference on Communications, 1993. OCC 93, Geneva, Technical Program, Conference Record, vol. 2, pp. 1245-1251, May 23-26, 1993.

Communication from the European Patent Office, European Search Report for Application No. EP 05 00 2026, May 8, 2006, 5 pages, Oct. 18, 2005.

Network Service Systems Laboratories, "Development of an OADM-Ring System," article printed on Oct. 8, 2003 (http://www.ntt.co.jp/RD/OFIS/active/2001pdfe/nw20_e.pdf), 1 page.

Converge! Newtork Digest, "New Access Communications Debuts Metro DWDM Platform," Jan. 21, 1999, (http://www.convergedigest.com/DWDM/DWDM%20Jan%2099.htm), 4 pages.

The Notification of Reason(s) for Refusal for Patent Application No. 2005-243068, drafted Jan. 13, 2009, Examiner Yoshiro Wakimizu, Article 29, Paragraph 2, mailed Jan. 20, 2009, received Apr. 13, 2009, 2 pages.

* cited by examiner

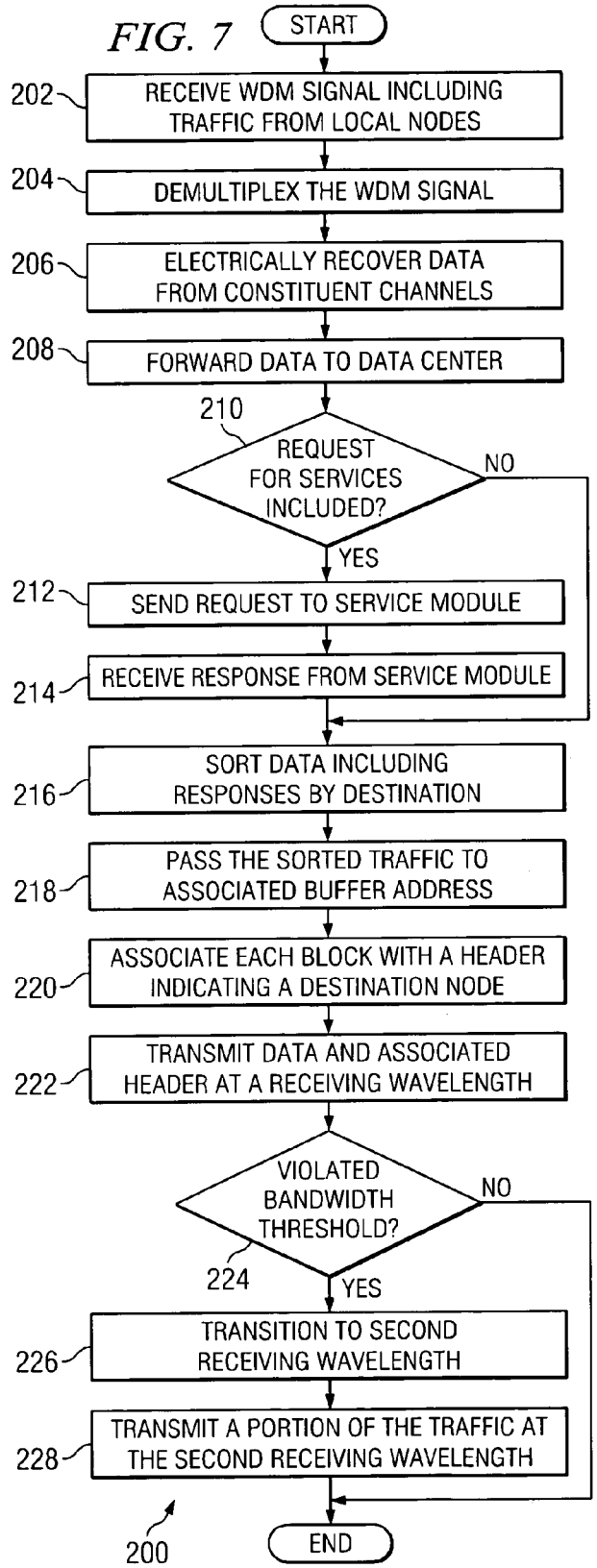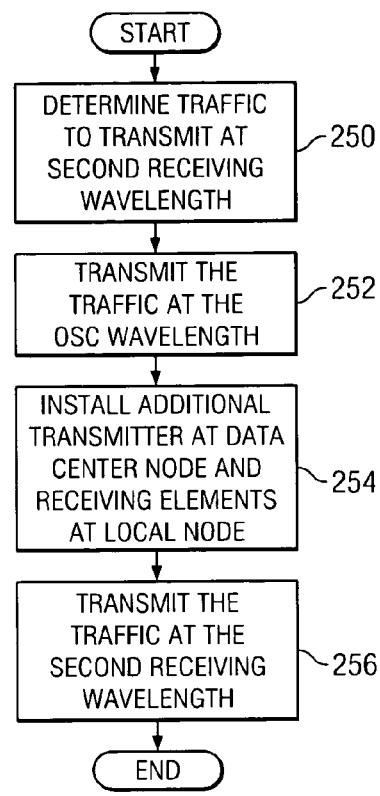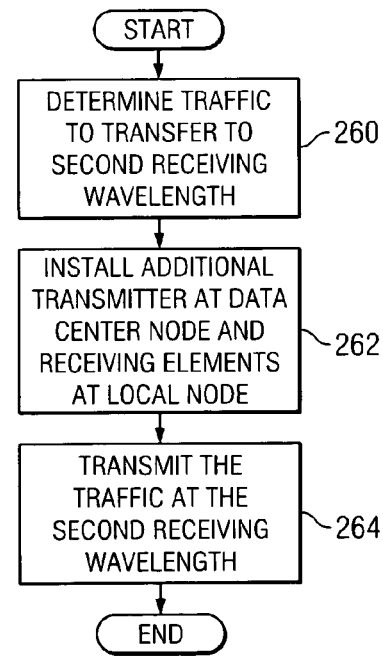

METHOD AND SYSTEM FOR A DATA CENTRIC ARCHITECTURE IN AN OPTICAL NETWORK

TECHNICAL FIELD

The present invention relates generally to optical networks and, more particularly, to a method and system for a data centric architecture in an optical network.

BACKGROUND

Telecommunication systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at different wavelengths. Network capacity is based on the number of wavelengths, or channels, in each fiber and the bandwidth or size of the channels. Network capacity in a ring network is also limited by data processing at each node in the ring.

The topology in which WDM and DWDM networks are built plays a key role in determining the extent to which such networks are utilized. Ring topologies are common in today's networks. WDM nodes serve as network elements on the periphery of such optical rings and traditionally require optical-to-electrical conversion at each node to route data to local clients. WDM add/drop equipment at each node typically employs optical-to-electrical or electrical-to-optical conversion of each constituent channel to add, drop, or pass a channel.

SUMMARY

A method and system for a data centric architecture in an optical network are provided. In one embodiment, a method and system for a data centric architecture in an optical network includes an optical ring. A number of local nodes are coupled to the optical ring and are configured to receive traffic at a receiving wavelength. Each local node is also configured to transmit traffic at an assigned wavelength different from the transmitting wavelengths assigned to the other local nodes. The transmitting wavelengths are each transmitted at a bandwidth less than the receiving wavelength. A data center node is coupled to the optical ring and operable to receive traffic from the local nodes, sort at least some of the traffic based on the destination of the traffic, and transmit the traffic at the receiving wavelength to the destination.

Technical advantages of certain embodiments of the present invention include providing a centralized data storage and processing facility in an optical network which may result in simplified network hardware, facilitate the optimization of Quality of Service (QoS), and reduces, minimizes, or eliminates cost of transmitting between nodes. Other advantages of one or more embodiments may include a reduction in the cost of maintaining the optical network due to the sharing of storage resources by various enterprises, lower cost due to placing the storage facility outside an urban location, and simple local node configuration. One or more embodiments may also have the advantage of reducing the number of transmitters and/or receiver cards in network nodes. Another technical advantage of one or more embodiments may include the ability to dynamically assign bandwidth to downstream traffic (by optically broadcasting along the ring and by both optical and electrical signal selection) that matches actual traffic patterns which may also reduce the number of transmitters and/or receiver cards in network nodes.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

FIG. 7 illustrates an example method for transmitting information in an optical communication system in accordance with one embodiment of the present invention;

FIG. 8 illustrates one embodiment of a transition step of FIG. 7; and

FIG. 9 illustrates another embodiment of the transition step of FIG. 7.

DETAILED DESCRIPTION OF THE DRAWINGS

Figure 1:
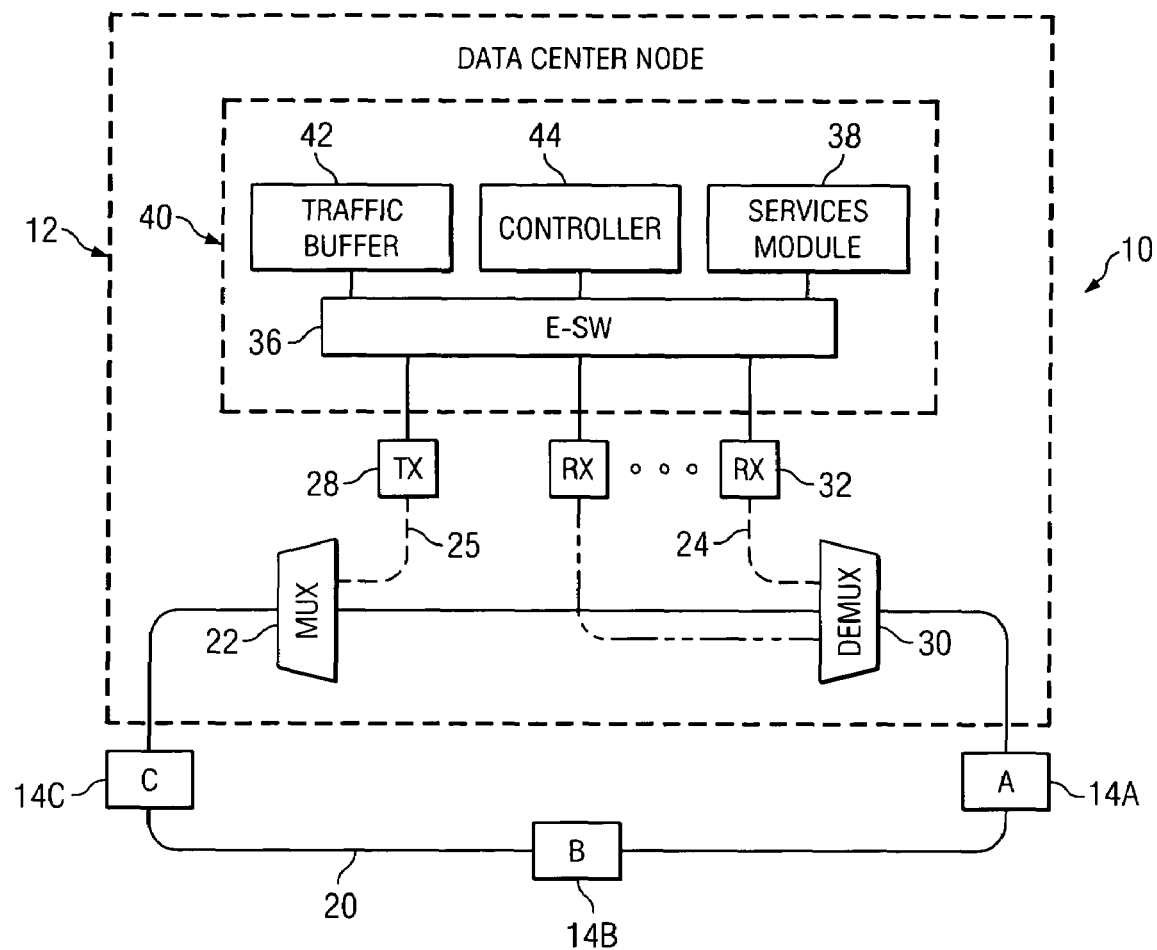
FIG. 1 is a block diagram illustrating an optical ring network in accordance with one embodiment of the present invention.

FIG. 1 illustrates an optical ring network 10 in accordance with one embodiment of the present invention; however, other suitable types of optical networks may be used in accordance with the present invention. An optical ring may include, as appropriate, a single, uni-directional fiber, a single, bi-directional fiber, or a plurality of uni- or bi-directional fibers. Furthermore, the network 10 is an optical network in which a number of optical channels are carried over a common path at different wavelengths. The network 10 may be a wavelength division multiplexed (WDM) network, a dense wavelength division multiplexed (DWDM) network, or any other suitable multi-channel network. The network 10 may be used in a short-haul metropolitan network, long-haul intercity network, or any other suitable network or combination of networks.

Referring to FIG. 1, the network 10 includes a data center node 12 and a plurality of local nodes 14 coupled to an optical ring 20. In the illustrated embodiment, the ring 20 comprises a single uni-directional fiber, transporting traffic in a counter-clockwise direction. The ring 20 optically connects the plurality of local nodes 14A, 14B, and 14C and the data center node 12, wherein each local node 14 may both transmit traffic to and receive traffic from other local nodes 14 via the data center node 12. Such traffic comprises optical signals having at least one characteristic modulated to encode audio, video, textual, real-time, non-real-time and/or other suitable data. Modulation may be based on phase shift keying (PSK), intensity modulation (IM), and other suitable methodologies.

Figure 3:
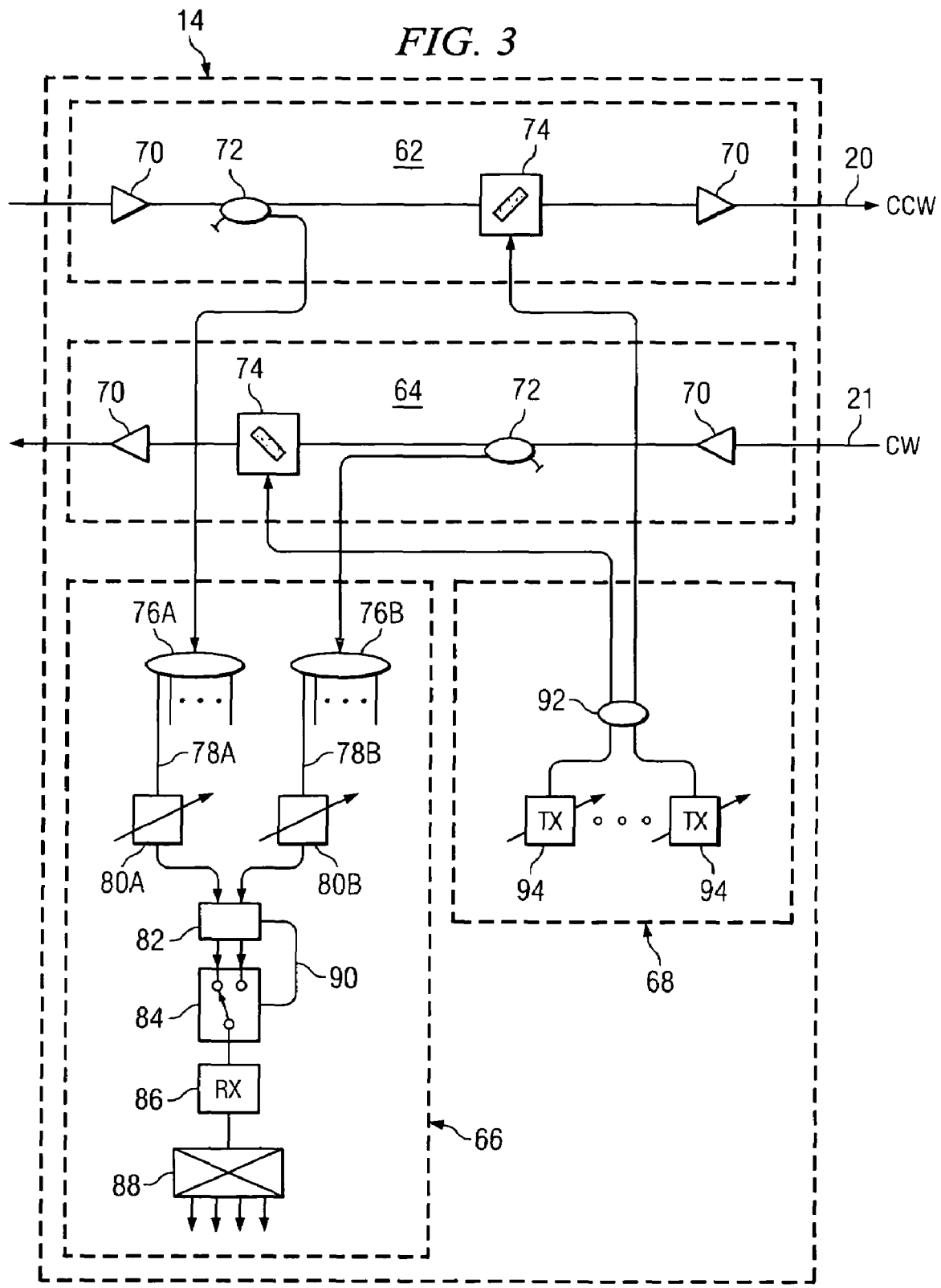
FIG. 3 is a block diagram illustrating one embodiment of an add/drop node of the optical ring network of FIG. 1.
Figure 4:
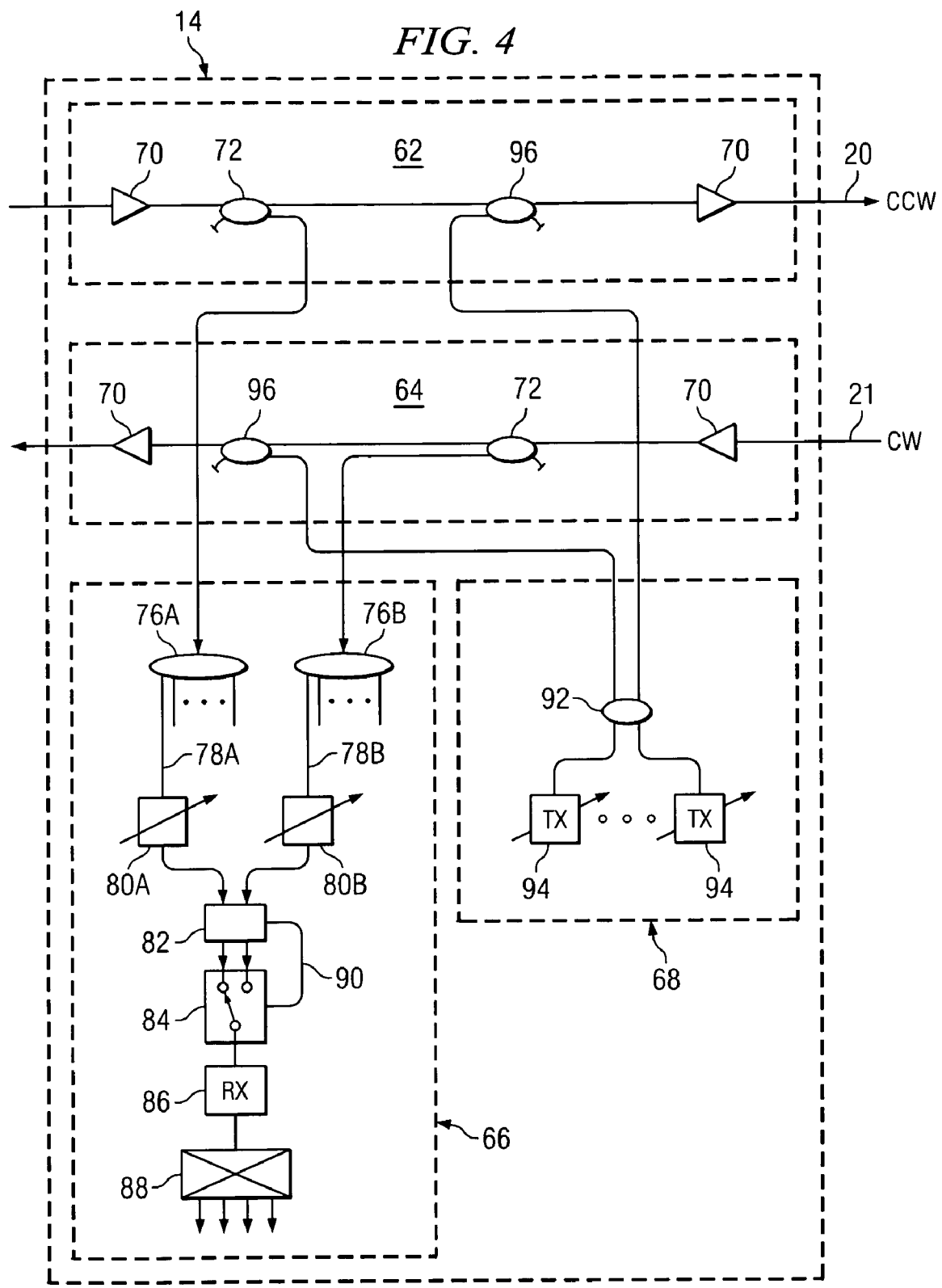
FIG. 4 is a block diagram illustrating another embodiment of an add/drop node of the optical ring network of FIG. 1.

The local nodes 14, two embodiments of which are further described with reference to FIGS. 3 and 4, are each operable to add and drop traffic to and from the ring 20. In particular, each local node 14 receives traffic from local clients and adds its traffic to the optical ring 20. At the same time, each local node 14 receives traffic from the ring 20 and drops traffic destined to it s local nodes 14. As used herein, the term "each" means every one of at least a subset of the identified items. Traffic may be added to the ring 20 by inserting the traffic transmitted by data center node 12 and local nodes 14 on the ring 20. Traffic may be dropped from the ring 20 by making the traffic available for transmission to the clients of local nodes 14. Additionally, traffic may be dropped from the ring 20 and yet continue to circulate in the ring 20. In particular embodiments, traffic is passively added to and dropped from the ring 20 using an optical coupler or other suitable device. "Passively" in this context means the adding or dropping of channels without using optical switches that use power, electricity, and/or moving parts. An active device would thus use power, electricity, or moving parts to perform work.

Once dropped from the optical ring 20, local node 14 may provide optical-to-electrical conversion of the dropped traffic for extracting data based on headers or tags associating portions of the traffic with a destination node. In particular embodiments, each local node 14 is operable to drop traffic transmitted at a receiving wavelength $\lambda_R$. Each local node 14 electrically converts traffic transmitted at $\lambda_R$ and extracts portions of associated traffic destined for the node 14 based on addressing information in the traffic. Addressing information may include a header, tag, or any other suitable addressing information. In certain embodiments, each local node 14 comprises a switch element (not illustrated) may forward the traffic (or a portion thereof) to one of a plurality of local clients based on addressing information. In one embodiment, the switch element comprises a Layer 2 (L2) switch. Each local node 14 may also be assigned a subband (or a portion of a subband) for adding traffic to optical network 10 that is different from subbands assigned to other local nodes 14. A subband, as used herein, means a portion of the bandwidth of the network comprising a subset of the channels of the network. In one embodiment, the entire bandwidth of a network may be divided into subbands of equal bandwidth, or, alternatively, of differing bandwidth. In one embodiment, the subband assigned to a local node 14 is a single wavelength different from wavelengths assigned to the other local nodes 14. For example, the local node 14A may be assigned a wavelength $\lambda_1$, wherein local node 14A adds traffic transmitted at the wavelength $\lambda_1$ to the ring 20. Similarly, the local nodes 14B and 14C may be assigned wavelengths $\lambda_2$ and $\lambda_3$, respectively, to add traffic to the ring 20. In addition, transmitting wavelengths $\lambda_1$, $\lambda_2$, and $\lambda_3$ may be different from receiving wavelength $\lambda_R$. Thus, in this case, interference between channels in the network 10 is substantially reduced by adding traffic at the assigned wavelengths and dropping traffic at the receiving wavelength. In another embodiment, each local node 14 is assigned a different subband including two or more wavelengths in which to add its local traffic. Thus, interference between channels in the network 10 is substantially eliminated by adding traffic in its subband and dropping traffic at the receiving wavelength. Additional components may be installed in local nodes 14 for receiving additional receiving wavelengths, as will be discussed below.

In yet another embodiment, at least one local node 14 is operable to receive traffic at a second receiving wavelength different from the another receiving wavelength used by one ore more other nodes 14.

Data center node 12 receives optical signals including service requests from local nodes 14 and transmits optical signals including responses to the service request to local nodes 14 at a receiving wavelength. Optical signals, as used herein, include channels which carry traffic in network 10. As used herein, "traffic" means information transmitted, stored, or sorted in the network, including any request for services as discussed in more detail below. Data is a type of traffic that may include audio, video, textual, real-time, non-real-time and/or other suitable data. In one embodiment, the data center node 12 includes a demultiplexer 30, a plurality of receivers 32, a data center 40, a transmitter 28, and a multiplexer 22. The demultiplexer 30 demultiplexes WDM or other multi-channel optical signals transmitted over the optical ring 20 into constituent channels and sends each optical signal 24 to a optical receiver 32. Each optical receiver 32 electrically recovers the encoded data from the corresponding traffic. The data is then forwarded to the data center 40. The data center 40 receives the data, sorts the data based on the node 14 for which it is destined, and passes the sorted data to transmitter 28 for transmitting traffic to local nodes 14 at a receiving wavelength $\lambda_R$. As used herein, a destination node is the node that is the destination for transmitted data on the ring. Optical transmitter 28 generates an optical signal 25 at the receiving wavelength $\lambda_R$. The optical signal 25 comprises an optical signal with at least one characteristic modulated to encode audio, video, textual, real-time, non-real-time, or other suitable data.

In particular embodiments, data center node 12 comprises multiple transmitters 28 (not illustrated) and, in response to the level of traffic to be transmitted by data center node 12 exceeding a threshold (e.g., 10 Gigabits per second (Gb/s)), data center node 12 transmits traffic in two or more receiving wavelengths. For example, channel spacing between receiving wavelengths may be 100 Gigahertz (GHz) in the C-band. In such embodiments, different subsets of local nodes 14 are assigned different receiving wavelengths. For example, data center node 12 may transmit traffic destined for local node 14A at a first receiving wavelength $\lambda_{R1}$ and traffic destined for local nodes 14B and 14C at a second receiving wavelength $\lambda_{R2}$. In certain embodiments, the channel spacing may be selected to avoid or minimize crosstalk between adjacent signals. If two or more transmitters 28 are transmitting at two or more receiving wavelengths, the optical information signals 25 are multiplexed into a single optical signal by the multiplexer 22 for transmission on the optical ring 20.

In the illustrated embodiment, the data center 40 includes an in-line switch 36, a traffic buffer 42, a controller 44, and a services module 38. The switch 36 is coupled to the traffic buffer 42, the controller 44, and the services module 38. While not illustrated, data center 40, in one embodiment, comprises a Layer 3 (L3) switch for passing traffic to and from an Internet Protocol (IP) network coupled to network 10 via data center node 12. The switch 36 passes traffic received from the receivers 32 to the traffic buffer 42 and forwards traffic stored in the traffic buffer 42 to transmitter 28. The switch 36 may comprise a Layer 2 switch such as an Ethernet switch, IP switch, fiber channel (FC) switch, a router or other suitable devices for selectively directing traffic. The traffic buffer 42 is memory operable to store inter- and intra-network traffic. The traffic buffer 42 may comprise a single memory device or multiple memory devices. It will be understood that a memory device may include hard disk drive, a random access memory, non-volatile memory, and any other suitable or combination thereof.

The controller 44 controls access to the traffic buffer 42 and services module 38 and may comprise logic stored in media. The logic comprises functional instructions for carrying out programmed tasks. The media comprises computer disks, memory or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized. In one embodiment, controller 44 comprises a server. The controller 44 is operable to send a command signal to the electrical switch 36 to facilitate the sorting of both inter- and intra-network traffic.

In one embodiment, the traffic buffer 42 has buffer addresses associated with each local node 14. In this case, conventional "write in" and "read out" commands may be used to store traffic destined for a local node 14 at a buffer address associated with that local node 14. As a result, the command signal sent to the switch 36 may include a buffer address associated with the destination node. After receiving the command signal, the switch 36 passes the data to the corresponding buffer address in the traffic buffer 42. A scheduler in the controller 44 schedules data out of the queue associated with the corresponding buffer address. In one embodiment, the queue is a first-in first-out queue. It will be understood that the traffic may be otherwise sorted. The switch 36 forwards the traffic stored at the buffer address to transmitter 28. As discussed above, the transmitter 28 encodes an optical signal 25 at the receiving wavelength such the each local node 14 is operable to drop the receiving wavelength from optical network 10.

The services module 38 is operable to process and generate a response to a request for a service from a node, wherein the node may be an intra- or inter-network node, i.e., a node in or external to network 10, respectively. It will be understood that services may include providing data, storing data, processing data, or providing other services in a network system. Services module 38 may be implemented as hardware (e.g., a microchip), firmware and/or software. Local nodes 14 transmit at assigned wavelengths requests for services to data center node 12, which are received by demultiplexer 30 and electronically recovered by receiver 32. Once recovered from the optical signal 24, the request is passed to switch 36. The switch 36 forwards the request to the services module 38. The request may be directly forwarded to the services module 38 or forwarded to an address in buffer 42 associated with services module 38 prior to forwarding the request to service module 38. The services module 38 processes the request and generates a response. In one embodiment, the response to a request for video includes a file containing audiovisual content. In another embodiment, the response to a request to store data includes an acknowledgement that data was received. In yet another embodiment, the response includes data processed by the services module 38. The switch 36 receives the response generated by the services module 38 and passes it to the address in the traffic buffer 42 associated with the destination node. The switch 36 forwards the response along with other traffic stored at the buffer address to a transmitter 28 associated with the buffer address and, thus, associated with the destination node. The transmitter 28 encodes the response (and potentially other responses to the same or different nodes 14) as an optical information signal 25 at a receiving wavelength $\lambda_R$.

Figure 2B:
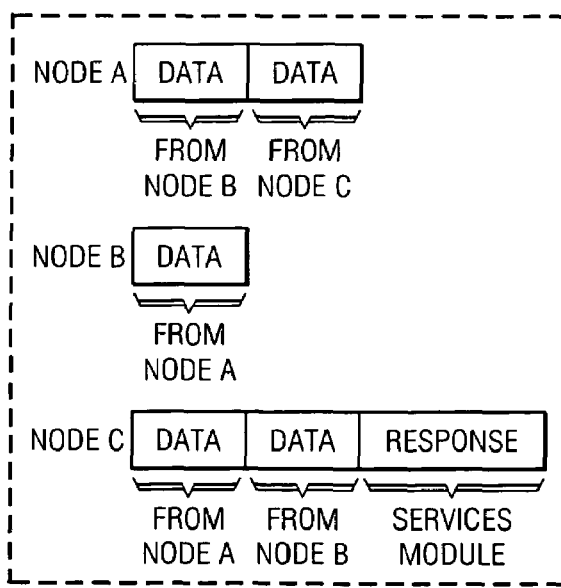
FIG. 2B figuratively represents a traffic buffer in the optical ring network in accordance with one embodiment of the present invention.
Figure 2A:
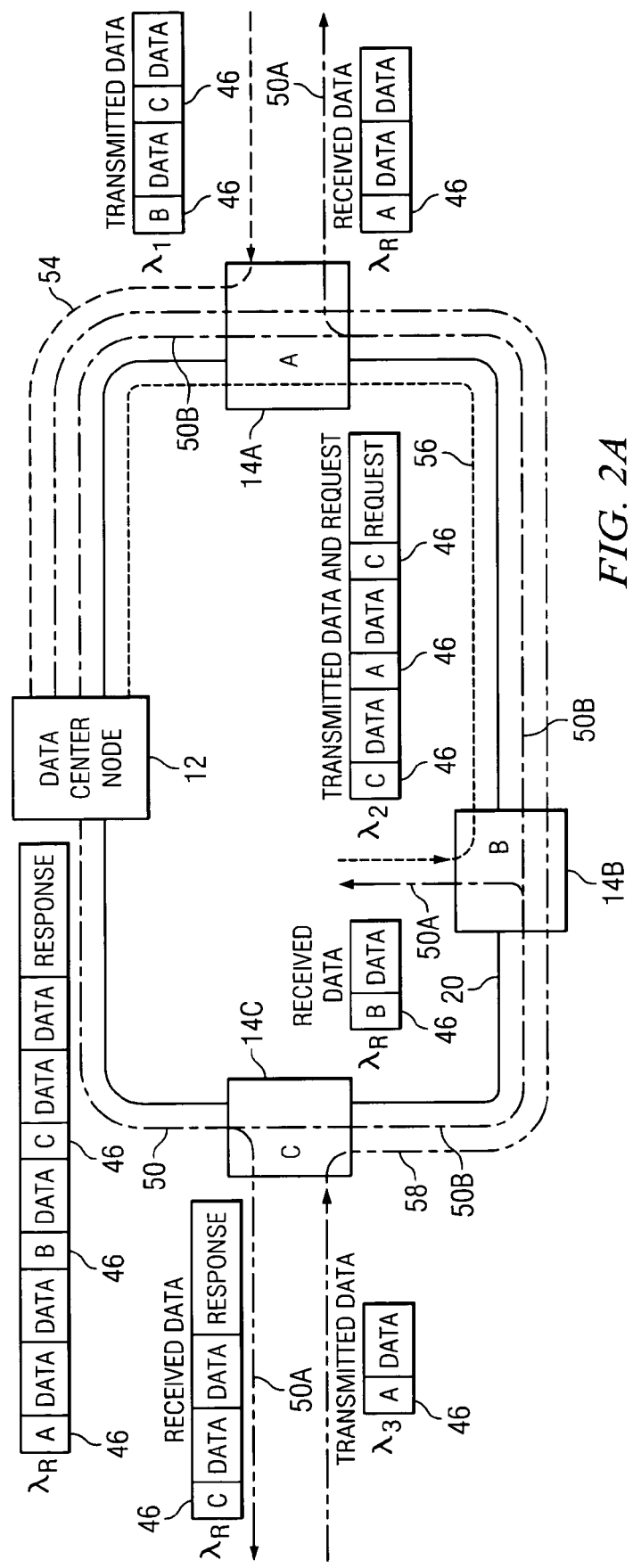
FIG. 2A is a block diagram illustrating an example operation of the optical ring network of FIG. 1.

FIG. 2A is one embodiment of the optical network 10 of FIG. 1 in operation. The data center node 12 receives optical traffic 54 transmitted at $\lambda_1$, optical traffic 56 transmitted at $\lambda_2$, and optical traffic 58 transmitted at $\lambda_3$ from nodes 14A, 14B, and 14C, respectively. The data center node 12 receives the traffic 54, 56, and 58 and sorts the traffic and any responses to the optical traffic 54, 56, and 58 by destination node. The destination nodes are indicated by addressing information 46. The data center node 12 generates responses, if appropriate, sorts the data including responses by destination node, and passes the sorted data to transmitter 28 for transmitting traffic at the receiving wavelength $\lambda_R$. Transmitter 28 encodes an optical signal 50 with the data including responses at wavelength $\lambda_R$, where each local node 14 is operable to drop signals at wavelength $\lambda_R$. In order to control interference, the receiving wavelength $\lambda_R$ is different from the transmitting wavelengths $\lambda_1, \lambda_2$, and $\lambda_3$. In the illustrated embodiment, the local nodes 14A, 14B, and 14C are each configured to passively split optical signal 50 into a drop signal 50A and a pass-through signal 50B. Conventional optical-to-electrical conversion may be performed on the dropped signal to extract any data including responses destined for the local node 14. Once extracted, a switching element (not illustrated) may forward the data and responses to appropriate local clients based on associated addressing information.

For example, the node 14A adds the optical traffic 54, which is transmitted at wavelength $\lambda_1$, to the ring 20. The optical traffic 54 includes two blocks of data whose destination nodes are the nodes 14B and 14C, respectively, as indicated by the addressing information 46. The data center node 12 receives and decodes the optical traffic 54 and recovers the data and the destination node addressing information for each data block. The data center node 12 sorts the data by destination node by storing the traffic at a buffer address associated with the corresponding destination node. The node 14B also adds the optical traffic 56, which is transmitted at wavelength $\lambda_2$, to the ring 20. The optical traffic 56 includes two blocks of data and a request (for example, a video-on-demand service request) having destinations nodes 14C, 14A, and 14C, respectively, as indicated by the addressing information 46. The data center node 12 receives and decodes the optical traffic 56 and recovers the data and request and the destination node for the data and request, as indicated by addressing information 46. The data center node 12 processes the request encoded in the optical traffic 56 and generates a response, as discussed above. The data center node 12 sorts the data by destination node by storing the traffic at a buffer address associated with the corresponding destination node. In the illustrated embodiment, the node 14C also adds the optical signal 58, which is transmitted at the wavelength $\lambda_3$, to the ring 20. The optical signal 58 includes one block of data whose destination is the node 14A as indicated by the addressing information 46. The data center node 12 receives and decodes the optical signal 58 and recovers the data including the destination node addressing information 46. The data center node 12 sorts the data by destination node by storing the traffic at a buffer address associated with the corresponding destination node. The stored data is forwarded to transmitter 28 in response to a command signal from controller 44.

In one aspect of operation, the controller 44, illustrated in FIG. 1, controls the storing and transmission of traffic in network 10 via buffer 42. Controller 44 sends a command signal to the switch 36 including a buffer address associated with the destination node. The command signal may be sent periodically, in response to a buffer address approaching capacity, or based on any other suitable criteria. After receiving the command signal, the switch 36 passes the data to the corresponding buffer address in the traffic buffer 42, which is represented in FIG. 2B. FIG. 2B figuratively represents traffic buffer 42 in accordance with the illustrated embodiment. Each buffer address is associated with a destination node. The illustrated buffer indicates that the destination node 14A will be sent two data blocks, where one originated from the node 14B and one from the node 14C. In this embodiment, the illustrated buffer also indicates that the destination node 14B will be sent one data block, originating from node 14A. In this embodiment, the illustrated buffer also indicates that the destination node 14C will be sent two data blocks and a response, one data block from each of nodes 14A and 14B and the response from the services module 38. Each data block will be associated with addressing information 46 identifying the destination node of the respective data block. In one embodiment, buffer 42 automatically forwards traffic to transmitter 28 such as in response to an associated address reaching capacity. Once each block is labeled with addressing information 46, the data and addressing information 46 will be transmitted at the receiving wavelength $\lambda_R$. As described above, the nodes 14A, 14B, and 14C are configured to receive the traffic at the receiving wavelengths $\lambda_R$.

In response to an increase of downstream traffic transmitted at the receiving wavelength $\lambda_R$ above a bandwidth threshold, data center node 12 may transmit at least a portion of the downstream traffic at a second receiving wavelength $\lambda_{R2}$. A bandwidth threshold is a value above which traffic transmitted at a first wavelength is transferred to a second wavelength and results in the bandwidth of the first wavelength being less than an operating threshold. A bandwidth threshold may be selected based on any appropriate characteristic such as, for example, a maximum capacity of a receiving wavelength. The operating threshold may represent a capacity operating under normal conditions for network 10. For example, a threshold bandwidth may be 10 Gb/s and an operating threshold may be 5 Gb/s. Data center 12 determines what traffic to transmit at $\lambda_{R2}$ to reduce the bandwidth of traffic transmitted at $\lambda_R$ below the bandwidth threshold. Traffic destined for one or more local nodes 14 may be forwarded to a second transmitter transmitting traffic at $\lambda_{R2}$. Transmitting traffic at a second receiving wavelength may require installing a second transmitter 28 at data center node 12 and optical components at the one or more local nodes for receiving the second receiving wavelength, as will be discussed below. Additional receiving wavelengths may be added to network 10 as downstream traffic continues to increase, in which case additional transmitters 28 and additional optical components at local nodes 14 may be required (See FIGS. 3 and 4).

FIG. 3 illustrates one embodiment of an add/drop node 14. In the illustrated node 14, traffic is passively dropped from fiber 20 and 21. While not illustrated in FIG. 1, adding fiber 21 to network 10 may provide protection switching. If fiber 21 is not included in network 10, the following embodiments of add/drop node 14 illustrated in FIGS. 3 and 4 will not include components associated with fiber 21. The illustrated embodiment uses couplers and a receiving element 66 to extract wavelengths assigned to node 14 and forward data segments to associated clients. As described below, local traffic may be added to the fibers 20 and 21 in a subband assigned to node 14 for adding traffic to fibers 20 and 21.

Referring to FIG. 3, the node 14 comprises a first, or counterclockwise transport element 62, a second, or clockwise transport element 64. In the illustrated embodiment, the node 14 comprises the transmitting element 68 and the receiving element 66. Alternatively, transmitting element 68 and the receiving element 66 may be separate from node 14. The transport elements 62 and 64 add and drop traffic to and from the fibers 20 and 21, remove previously transmitted traffic, and/or provide other interaction of the node 14 with the fibers 20 and 21. The transmitting element 68 generates local add signals to be added to the fibers 20 and 21 by the transport elements 62 and 64. The receiving element 66 receives local drop signals dropped from the fibers 20 and 21 by transport elements 62 and 64. In particular embodiments, the transport, transmitting, and receiving elements 62, 64, 68, and 66 may each be implemented as a discrete card and interconnected through a backplane of a card shelf of the node 14. Alternatively, the functionality of one or more elements 62, 64, 68, and 66 may be distributed across a plurality of discrete cards. In this way, the node 14 is modular, upgradeable, and provides a "pay-as-you-grow" architecture. The components of node 14 may be coupled by direct, indirect or other suitable connection or association. In the illustrated embodiment, the elements 62, 64, 68, and 66 and devices in the elements are connected with optical fiber connections, however, other embodiments may be implemented in part or otherwise with planar wave guide circuits and/or free space optics.

In one embodiment, the transport elements 62 and 64 each comprise amplifiers 70, a drop coupler 72, and an add filter 74. The amplifiers 70 amplifies the optical signals. The drop coupler 72 is operable to split the optical signal into a drop signal and a pass-through signal, wherein both signals are substantially the same. In addition, the transport elements 62 and 64 each comprise an add filter 74 operable to terminate signals at the assigned subband and to combine both the assigned subband generated at transmitting element 68 and the pass-through signal. Add filter 74 may comprise a thin-film, fixed filters, tunable filters, or other suitable filters, and each filter 74 may comprise a single filter or a plurality of filters connected serially, in parallel, or otherwise.

The drop coupler 72 may each comprise an optical fiber coupler or other optical splitter operable to combine and/or split an optical signal. As used herein, an optical splitter or an optical coupler is any device operable to combine or otherwise generate a combined optical signal based on two or more optical signals and/or to split or divide an optical signal into discrete optical signals or otherwise passively discrete optical signals based on the optical signal. The discrete signals may be similar or identical in frequency, form, and/or content. For example, the discrete signals may be identical in content and identical or substantially similar in power, may be identical in content and differ substantially in power, or may differ slightly or otherwise in content. In one embodiment, each coupler 72 may split the signal into two copies with substantially different power.

The amplifiers 70 may be Erbium-doped fiber amplifiers (EDFAs) or other suitable amplifiers capable of receiving and amplifying an optical signal. To reduce the optical power variations of the clockwise ring 21 and of the counterclockwise ring 20, the amplifiers 70 may use an automatic level control (ALC) function with wide input dynamic-range. Hence the amplifiers 70 may deploy automatic gain control (AGC) to realize gain-flatness against input power variation, as well as variable optical attenuators (VOAs) to realize ALC function.

During operation of node 14, the amplifier 70 of each transport element 62 and 64 receives an signal from the connected fiber 20 or 21 and amplifies the signal. The amplified signal is forwarded to the drop coupler 72. The drop coupler 72 splits the signal into a pass-through signal and a drop signal. The drop signal includes at least a subset of the set of wavelengths assigned to the node 14. The pass-through signal is forwarded to the add filter 74. The local drop signal is forwarded from the drop coupler 72 to receiving element 66, which selectively passes the input signals to a receiver 86. The add filter 74 combines the pass-through signal and signals generated by the transmitting element 68.

In the illustrated embodiment, the receiving element includes two 1×n couplers 76, a plurality of tunable (or fixed) filters 80, a plurality of selectors 82, a plurality of 2×1 switches 84, a receiver 86, and a switch element 88. The 1×n couplers 76 may comprise one optical fiber lead and a plurality of optical fiber leads which serve as drop leads 78. The drop leads 78 may be connected to the plurality of tunable filters 80 operable to pass a selected wavelength and reject other wavelengths. In the illustrated embodiment, drop lead 78A associated with fiber 20 and drop lead 78B associated with fiber 21 are coupled to tunable filters 80A and 80B, respectively. In response to downstream traffic exceeding a bandwidth threshold, data center node 12 transmits at least a portion of the downstream traffic at a second wavelength. In this case, additional tunable filters 80 may be coupled to couplers 76 to selectively pass the added receiving wavelength. The selected wavelengths from 80A and 80B are passed to the selector 82 and switch 84, which allows selective connection of the receiver 86 with either an associated drop signal coming from the ring 20 or an associated drop signal coming from the ring 21. Such selective switching may be used to implement Optical Unidirectional Path-Switched Ring (OUPSR) protection switching. In a particular embodiment, the selector 82 is initially configured to forward to the local client(s) traffic from a fiber 20 or 21 that has the lower Bit Error Rate (BER). A threshold value is established such that the switch remains in its initial state as long as the BER does not exceed the threshold. Another threshold or range may be established for power levels. For example, if the BER exceeds the BER threshold or if the power falls above or below the preferred power range, the switch selects the other signal. Commands for switching may be transmitted via connection 90. This results in local control of switching and simple and fast protection. After optical-to-electrical conversion of the signal at receiver 86, switch element 88 forwards data segments to appropriate local clients based on associated addressing information. Switch element 88 may comprise any appropriate switch such as, for example, a L2 switch, L3 switch, or any other suitable switch.

In the illustrated embodiment, the transmitting element 68 comprises a 2×n coupler 92 and one or more tunable transmitters 94 that transmit at a set of wavelengths assigned to the node 14. The 2×n coupler 92 comprises a plurality of leads which serve as add leads and may be connected to the one or more tunable (or fixed-wavelength) transmitters 94. The tunable transmitters 94 are operable to transmit add signals at selected wavelengths and thus provide flexible assignment of wavelengths to the node 14. The coupler 92 splits the add signal into two substantially similar signals, wherein one signal is added to the fiber 20 and the other signal is added to the fiber 21. The add signals are forwarded to the add filters 74 for addition to the associated fiber 20 or 21, as described above. The add filters 74 rejects signals transmitted at the assigned subband and combines the pass-through signal with the add signals transmitted at the assigned subband by the transmitting element 68.

In the illustrated embodiment, the same or substantially the same signals are communicated over both the fibers 20 and 21. Therefore, a single set of the receivers 86 may be used to receive signals from the fibers 20 or 21 (one or the other are received, depending on the position of switch 84 and selector 82), the same set of the transmitters 94 may be used to transmit the same signals to both the fibers 20 and 21. Such a configuration is appropriate when providing OUPSR protection. However, in other embodiments, the node 14 may include a separate set of the receivers 86 associated with each of fibers 20 and 21, and a separate set of the transmitters 94 associated with each of fibers 20 and 21. In this case, no switch 84 and selector 82 are needed. Instead, the drop signals associated with each fiber 20 or 21 are coupled to the set of the receivers 86 associated with each ring. Therefore, different signals may be received from the fibers 20 and 21.

Similarly, instead of splitting the signal from a set of the transmitters 94 using a coupler 92 and providing this signal to both the fibers 20 and 21, a different signal may be generated by the set of the transmitters 94 associated with the fiber 20 and the set of the transmitters 94 associated with the fiber 21. Therefore, different signals may be communicated over each fiber 20 and 21. For example, a first signal can be added in a particular channel on the fiber 20 at the node 14, and an entirely different signal can be added in the same channel on the fiber 21 by the same node 14.

FIG. 4 illustrates one embodiment of an add/drop node 14. In the illustrated node 14, traffic is passively dropped from fiber 20 and 21. In particular, the illustrated embodiment uses couplers 72 and a receiving element 66 to extract wavelengths assigned to node 14. As described below, local traffic may be added to the fibers 20 and 21.

Referring to FIG. 4, the node 14 comprises a first, or counterclockwise transport element 62, a second, or clockwise transport element 64. The node 14 may comprise the transmitting element 68 and the receiving element 66. In the illustrated embodiment, the transmitting element 68 and the receiving element 66 are separate from the node 14. The transport elements 62 and 64 add and drop traffic to and from the fibers 20 and 21, remove previously transmitted traffic, and/or provide other interaction of the node 14 with the fibers 20 and 21. The transmitting element 68 generates local add signals to be added to the fibers 20 and 21 by the transport elements 62 and 64. The receiving element 66 receives local drop signals dropped from the fibers 20 and 21 by transport elements 62 and 64. In particular embodiments, the transport, transmitting, and receiving elements 62, 64, 68, and 66 may each be implemented as a discrete card and interconnected through a backplane of a card shelf of the node 14. Alternatively, the functionality of one or more elements 62, 64, 68, and 66 may be distributed across a plurality of discrete cards. In this way, the node 14 is modular, upgradeable, and provides a "pay-as-you-grow" architecture. The components of node 14 may be coupled by direct, indirect or other suitable connection or association. In the illustrated embodiment, the elements 62, 64, 68, and 66 and devices in the elements are connected with optical fiber connections, however, other embodiments may be implemented in part or otherwise with planar wave guide circuits and/or free space optics.

In one embodiment, the transport elements 62 and 64 each comprise amplifiers 70, a drop coupler 72, and an add coupler 96. The amplifiers 70 amplifies the optical signals. The drop coupler 72 is operable to split the optical signal into a drop signal and a pass-through signal, wherein both signals are substantially the same. In addition, the transport elements 62 and 64 each comprise an add coupler 96 operable to add/combine the pass-through signal and the signals generated by the transmitting element 68.

The add coupler 96 may each comprise an optical fiber coupler or other optical splitter operable to combine and/or split an optical signal. As used herein, an optical splitter or an optical coupler is any device operable to combine or otherwise generate a combined optical signal based on two or more optical signals and/or to split or divide an optical signal into discrete optical signals or otherwise passively discrete optical signals based on the optical signal. The discrete signals may be similar or identical in frequency, form, and/or content. For example, the discrete signals may be identical in content and identical or substantially similar in power, may be identical in content and differ substantially in power, or may differ slightly or otherwise in content. In one embodiment, each coupler 72 may split the signal into two copies with substantially different power.

The amplifiers 70 may be EDFAs or other suitable amplifiers capable of receiving and amplifying an optical signal. To reduce the optical power variations of the clockwise ring 21 and of the counterclockwise ring 20, the amplifiers 70 may use an ALC function with wide input dynamic-range. Hence the amplifiers 70 may deploy AGC to realize gain-flatness against input power variation, as well as VOAs to realize ALC function.

During operation of node 14, the amplifier 70 of each transport element 62 and 64 receives an signal from the connected fiber 20 or 21 and amplifies the signal. The amplified signal is forwarded to the drop coupler 72. The drop coupler 72 splits the signal into a pass-through signal and a drop signal. The drop signal includes at least a subset of the set of wavelengths assigned to the node 14. The pass-through signal is forwarded to the add coupler 96. The local drop signal is forwarded from the drop coupler 72 to receiving element 66, which selectively passes the input signals to a receiver 86. The add coupler 96 combines the pass-through signal and signals generated by the transmitting element 68.

In the illustrated embodiment, the receiving element includes two 1×n couplers 76, a plurality of tunable (or fixed) filters 80, a plurality of selectors 82, a plurality of 2×1 switches 84, and a receiver 86. The 1×n couplers 76 may comprise one optical fiber lead and a plurality of optical fiber leads which serve as drop leads 78. The drop leads 78 may be connected to the plurality of tunable filters 80 operable to pass a selected wavelength and reject other wavelengths. In the illustrated embodiment, drop lead 78A associated with fiber 20 and drop lead 78B associated with fiber 21 are coupled to tunable filters 80A and 80B, respectively. In response to downstream traffic exceeding a bandwidth threshold, data center node 12 transmits at least a portion of the downstream traffic at a second wavelength. In this case, additional tunable filters 80 may be coupled to drop leads 78 to selectively pass the added receiving wavelength. The selected wavelengths from 80A and 80B are passed to the selector 82 and switch 84, which allows selective connection of the receiver 86 with either an associated drop signal coming from the ring 20 or an associated drop signal coming from the ring 21. Such selective switching may be used to implement OUPSR protection switching. In a particular embodiment, the selector 82 is initially configured to forward to the local client(s) traffic from a fiber 20 or 21 that has the lower BER. A threshold value is established such that the switch remains in its initial state as long as the BER does not exceed the threshold. Another threshold or range may be established for power levels. For example, if the BER exceeds the BER threshold or if the power falls above or below the preferred power range, the switch selects the other signal. Commands for switching may be transmitted via connection 90. This results in local control of switching and simple and fast protection. After optical-to-electrical conversion of the signal at receiver 86, switch element 88 forwards data segments to appropriate local clients based on associated addressing information. As discussed above, switch element may comprise any appropriate switch such as, for example, a L2 switch, L3 switch, or any other suitable switch.

In the illustrated embodiment, the transmitting element 68 comprises a 2×n coupler 92 and a plurality of tunable (or fixed-wavelength) transmitters 94 that transmit at a set of wavelengths assigned to the node 14. The 2×n coupler 92 comprises a plurality of leads which serve as add leads and may be connected to the plurality of tunable transmitters 94. The tunable transmitters 94 are operable to transmit add signals at selected wavelengths and thus provide flexible assignment of wavelengths to the node 14. The coupler 92 splits the add signal into two substantially similar signals, wherein one signal is added to the fiber 20 and the other signal is added to the fiber 21. The add signals are forwarded to the add couplers 96 for addition to the associated fiber 20 or 21, as described above. The add couplers 96 receives the add signals transmitted at one of the assigned wavelengths and combines the pass-through signal with the add signals transmitted at the assigned wavelengths.

In the illustrated embodiment, the same or substantially the same signals are communicated over both the fibers 20 and 21. Therefore, a single set of the receivers 86 may be used to receive signals from the fibers 20 or 21 (one or the other are received, depending on the position of switch 84 and selector 82), the same set of the transmitters 94 may be used to transmit the same signals to both the fibers 20 and 21. Such a configuration is appropriate when providing OUPSR protection. However, in other embodiments, the node 14 may include a separate set of the receivers 86 associated with each of fibers 20 and 21, and a separate set of the transmitters 94 associated with each of fibers 20 and 21. In this case, no switch 84 and selector 82 are needed. Instead, the drop signals associated with each fiber 20 or 21 are coupled to the set of the receivers 86 associated with each ring. Therefore, different signals may be received from the fibers 20 and 21.

Similarly, instead of splitting the signal from a set of the transmitters 94 using a coupler 92 and providing this signal to both the fibers 20 and 21, a different signal may be generated by the set of the transmitters 94 associated with the fiber 20 and the set of the transmitters 94 associated with the fiber 21. Therefore, different signals may be communicated over each fiber 20 and 21. For example, a first signal can be added in a particular channel on the fiber 20 at the node 14, and an entirely different signal can be added in the same channel on the fiber 21 by the same node 14.

Figure 5:
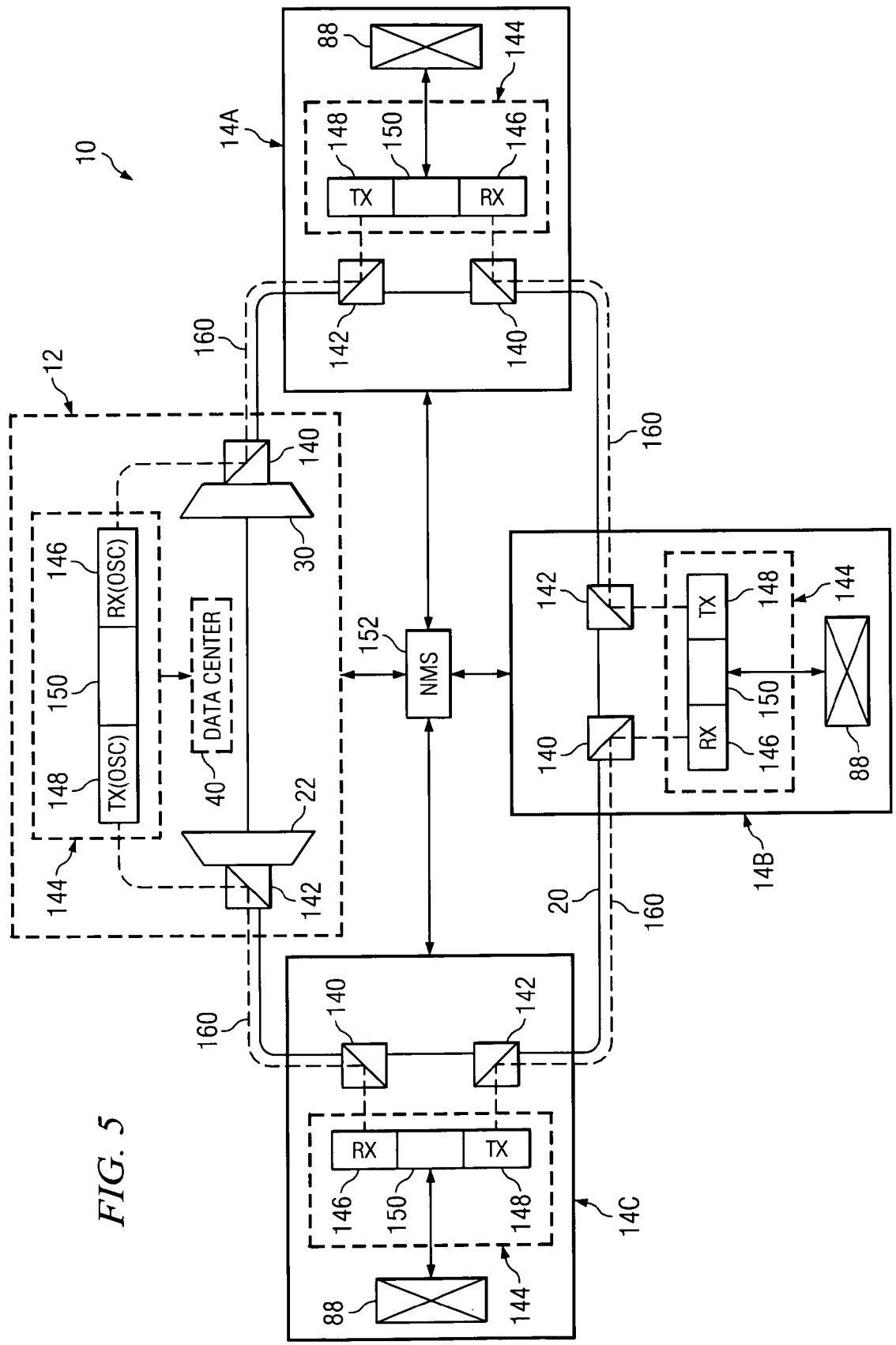
FIG. 5 is a block diagram illustrating an optical ring network in accordance with another embodiment of the present invention.

FIG. 5 is one embodiment of optical network 10 illustrated in FIG. 1 including an optical supervisory channel (OSC) to facilitate upgrading network 10 with additional receiving wavelengths. In this embodiment, the OSC signal is transmitted in an external band separate from the "working" traffic. The OSC may be a standardized OSC or the channel in which traffic is carried by optical-electrical-optical conversion at each node along the network. The OSC may be communicated using SONET (for example, OC-192), Ethernet (for example, 10 GbE), or any other suitable technology. In response to the bandwidth of the receiving wavelength $\lambda_R$ exceeding a bandwidth threshold, the OSC signal may temporarily transmit a portion of the traffic to reduce the bandwidth of the receiving wavelength. During this time, additional optical components may be added to network 10 for transmitting additional receiving wavelengths such that after their installation the portion included in the OSC signal is transmitted at the additional receiving wavelengths. As a result of using the OSC signal during the installation, network 10 can continue to operate and thus providing a smooth transition to additional receiving wavelengths. In a particular embodiment, the OSC signal is transmitted at a wavelength of 1510 nanometers (nm).

Referring to FIG. 5, each local node 14 and data center node 12 comprise a drop OSC filter 140 and an add OSC filter 142 for passively dropping and adding an OSC signal 160, respectively. The drop OSC filter 140 is operable to reject (drop) the OSC wavelength from the optical ring 20 and to pass through the other wavelengths of the optical signal. The drop OSC filter 140 drops the OSC signal 160 from optical ring 20 to a managing element 144 of each node 12 and node 14, described below. The add OSC filter 142 is operable to receive OSC signals 160 from the managing element 144 and to add the OSC wavelength to the optical ring 20. In one embodiment, each OSC filter comprises a fixed optical filter such as, for example, a fixed fiber Bragg grating and is operable to reject traffic at an assigned wavelength and to pass the remaining traffic. Further, each OSC filter may comprise a single filter or a plurality of filters connected serially, in parallel, or otherwise.

As mentioned above, each local node 14 and data center node 12 comprises a managing element 144. Each managing element 144 may comprise an OSC receiver 146, an OSC transmitter 148, and an element management system (EMS) 150. OSC receiver 146 and OSC transmitter 148 receive and transmit OSC signals, respectively, for the EMS 150. The EMS 150 may be communicably connected to a network management system (NMS) 152. Conventionally, EMS 150, NMS 152 and/or the OSC signals perform network and/or node monitoring, failure detection, protection switching, and loopback or localized testing functionality of the network 10. In the illustrated embodiment, EMS 150, NMS 152 and/or the OSC signals perform the additional task of facilitate transitioning to additional receiving wavelengths in response to bandwidth threshold violations. NMS 152 may reside within local nodes 14 and data center node 12, external to all of the nodes, or otherwise located. In one embodiment, the filters 140 and 142 and managing element 144 as well as components within the elements and other components within the nodes may be interconnected with optical fiber links. In other embodiments, the components may be implemented in part or otherwise with planar waveguide circuits and/or free space optics. In addition, as described in connection with nodes 14, the components of each local node 14 may each be implemented as one or more discrete cards within a card shelf of the node 14.

Data center 40 of node 12 is coupled to the managing element 144 of node 12. Even though not illustrated, data center 40 may alternatively comprise managing element 144. As discussed in detail above, data center 40 receives data, sorts the data by destination node, and passes the sorted data to an appropriate transmitter for transmitting traffic destined for local nodes 14. In the illustrated embodiment, data center 40 is further operable to receive traffic transmitted on the OSC signal from managing element 144 and pass traffic to managing element 144 for transmission to local nodes 14. In response to a receiving wavelength exceeding a bandwidth threshold, data center 40 pass traffic to the managing element 144 to transmit at least a portion of the downstream traffic at the OSC wavelength. As discussed above, the OSC signal facilitates adding to additional receiving wavelengths to network 10.

In one aspect of operation, data center node 12 receives traffic from nodes 14 as described above, sorts the traffic by destination, and transmits the traffic to destination nodes 14 at a receiving wavelength, for example, $\lambda_{40}$. In response to downstream traffic transmitted at $\lambda_{40}$ exceeding a bandwidth threshold, node 12 determines that a second receiving wavelength is needed and determines which downstream traffic to transmit at the second receiving wavelength (for example, $\lambda_{39}$) to reduce the bandwidth of $\lambda_{40}$ below an operating threshold. The operating threshold may be less than the bandwidth threshold. For example, the downstream traffic to communicate on $\lambda_{39}$ may be determined by transferring the transmission of downstream traffic from $\lambda_{40}$ to $\lambda_{39}$ on a node-by-node basis (the node to which the traffic is destined) starting with the node having the smallest amount of associated downstream traffic, and then with the node having the next smallest associated amount of downstream traffic, etcetera, until the total downstream traffic transmitted on $\lambda_{40}$ is reduced below the operating threshold. In other embodiments, traffic could be transferred from $\lambda_{40}$ in any other suitable manner.

As an example, assuming that node 14A has the smallest amount of associated downstream traffic, node 14B has the next smallest amount of associated downstream traffic, and node 14C had the most associated downstream traffic, node 12 may determine that transmitting traffic destined for local node 14A at the second receiving wavelength $\lambda_{39}$ reduces the bandwidth of $\lambda_{40}$ below the operating threshold. In this example, node 12 communicates a command to data center 40 such that traffic destined for local node 14A is forwarded from data center 40 to managing element 144 of data center node 12 for transmitting at the OSC wavelength $\lambda_{OSC}$. In one embodiment, the OSC signal 160 comprises OSC function and a portion reserved for traffic transitioning to additional receiving wavelengths. In this case, the bandwidth of OSC reserved for OSC functions transmits conventional network management functions. The OSC signal 160 may also comprises another portion of the bandwidth reserved for upstream traffic such that the OSC signal may include traffic destined for node 12.

While downstream traffic destined for local node 14A is transmitted at $\lambda_{OSC}$, an additional transmitter 28 may be installed at data center node 12 to accommodate transmission of data at the second receiving wavelength $\lambda_{39}$. In connection with the installation of the additional transmitter 28 appropriate installations and/or adjustments are made to the receiving local node 14. For example, an additional tunable filter 80 may be connected to a dropdown lead 78 and an additional selector 82, 2×1 switch 84, and receiver 86 may also be added. Alternatively, an existing tunable filter 80 could be tuned to $\lambda_{39}$. Once installation of the additional transmitter 28 and installation, if appropriate, of additional receiving elements at the associated local node 14 are completed, the EMS 150 communicates this completion to NMS 152 for transitioning to $\lambda_{39}$. Node 12 communicates a command to data center 40 for routing traffic destined for the associated local node 14 to transmitter 28 transmitting at $\lambda_{39}$. For example, data center 40 forwards traffic destined for local nodes 14B and 14C to transmitter 28 transmitting at $\lambda_{40}$ and forwards traffic destined for local node 14A to transmitter 28 transmitting at $\lambda_{39}$.

In another aspect of operation, all traffic destined for local nodes 14 is sorted by data center 40 and forwarded to managing element 144 for transmission of downstream traffic at the OSC signal transmitting at $\lambda_{OSC}$. In response to traffic exceeding a bandwidth threshold, node 12 determines which downstream traffic to transfer to another wavelength (for example, $\lambda_{40}$) such that the total traffic in $\lambda_{OSC}$ is below an operating threshold. For example, node 12 may determine that the total bandwidth of downstream traffic transmitting at $\lambda_{OSC}$ exceeds the bandwidth threshold of 10 Gigabits per second (10 Gb/s). The downstream traffic to communicate on $\lambda_{40}$ may be determined by transferring the transmission of downstream traffic from $\lambda_{OSC}$ to $\lambda_{40}$ on a node-by-node basis (the node to which the traffic is destined) starting with the node having the largest amount of associated downstream traffic, and then with the node having the next largest associated amount of downstream traffic, etcetera, until the total downstream traffic transmitted on $\lambda_{OSC}$ is reduced below the operating threshold (for example, below 5 Gb/s). In other embodiments, traffic could be transferred from $\lambda_{OSC}$ in any other suitable manner.

As an example, assuming that node 14A has the smallest amount of associated downstream traffic, node 14B has the next smallest amount of associated downstream traffic, and node 14C had the most associated downstream traffic, node 12 may determine that transferring traffic destined for local node 14C to $\lambda_{40}$ will reduce traffic transmitted at $\lambda_{OSC}$ to below an operating threshold of 5 Gb/s. A transmitter 28 transmitting at $\lambda_{40}$ may be installed at data center node 12 and tunable or fixed filters that select $\lambda_{40}$ and associated receiving elements are installed (or adjusted) at local node 14C for receiving traffic transmitting at $\lambda_{40}$. Once the installation is complete, EMS 150 communicates this completion to NMS 152. Node 12 communicates a command to data center 40 to forward all traffic destined for local node 14C to transmitter 28 transmitting at $\lambda_{40}$.

Furthermore, if traffic transmitted at $\lambda_{40}$ violates a bandwidth threshold associated with transmitter 28, optical network 10 may proceed with the transitioning procedures described above for transitioning particular downstream traffic from $\lambda_{40}$ to wavelength $\lambda_{39}$ using the $\lambda_{OSC}$ as a temporary transmission wavelength (while a transmitter is installed at node 12 for $\lambda_{39}$). This process may require transitioning to $\lambda_{39}$ in stages if adding all traffic to be transitioned to $\lambda_{39}$ from $\lambda_{OSC}$ would violate the bandwidth threshold associated with $\lambda_{OSC}$. For example, assuming traffic transmitted at $\lambda_{40}$ includes traffic destined for local nodes 14A, 14B, and 14C and node 12 determines that transmitting traffic destined for local nodes 14A and 14B at $\lambda_{39}$ will reduce traffic below the operating threshold. However, if traffic destined for local nodes 14A and 14B were added to $\lambda_{OSC}$ result in violating the bandwidth threshold of $\lambda_{OSC}$, then node 12 may communicate a command to transmit traffic destined to local node 14A at $\lambda_{OSC}$. Once traffic destined for local node 14A is transitioned to $\lambda_{39}$, then node 12 communicates a command to transition traffic destined for local node 14B.

Figure 6:
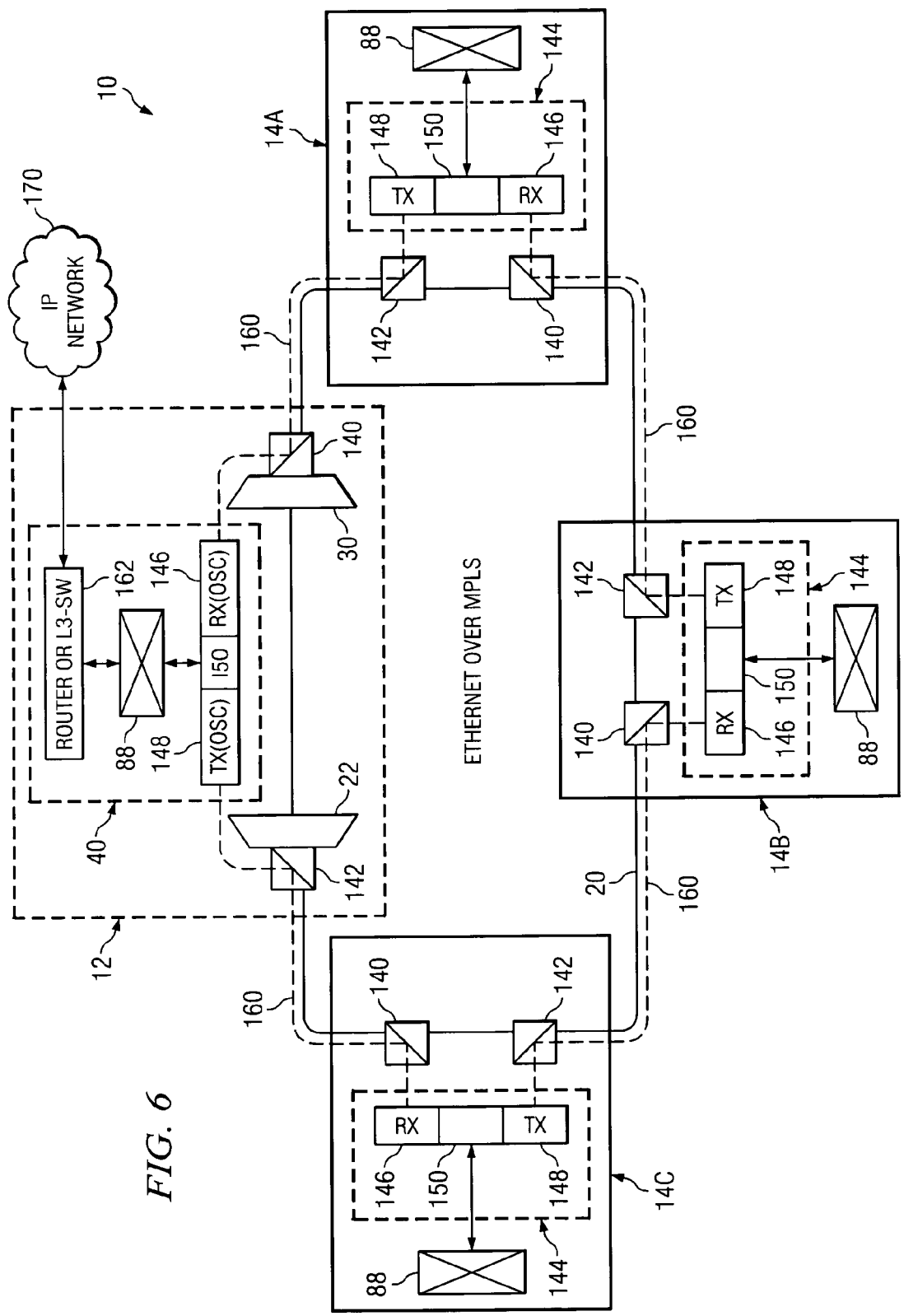
FIG. 6 is a block diagram illustrating an optical ring network in accordance with another embodiment of the present invention.

FIG. 6 illustrates one embodiment of optical network 10 employing the OSC channel for layer-3 functions. In the illustrated embodiment, optical network 10 is coupled to an internet protocol (IP) network 170 via a layer-3 switch (or router) 162. EMS 150 of each local node 14 determines the network elements and/or LANs connected to each local node 14 via the layer-2 switch 88 and the ports of switch 88 to which the network elements or LANs are connected. EMS 150 transmits this information to layer-2 switch 88 over OSC signal 160. In one embodiment, EMS 150 uses Ethernet-based tags to identify the network elements and/or LANs and transmits this information to layer-2 switch 88. Based on this information, layer-2 switch 88 determines tag assignments for each port of local nodes 14. In one aspect of operation, layer-2 switch 88 receives traffic destined for local clients of one or more local nodes 14. In this case, tags included in the received traffic are sent over the OSC signal 160 to EMS 150 of local nodes 14 instructing the local nodes 14 to which port to send the incoming traffic. EMS 150 receives tags and instructs layer-2 switch 88 where to send data.

FIG. 7 is an exemplary flow diagram illustrating a method 200 for transmitting traffic in an optical network. The method begins at step 202 where a WDM signal including traffic from local nodes 14 is received at data center node 12. At step 204, the WDM signal is demultiplexed into its constituent channels. Receivers 32 electrically recover data including request from the constituent channels at step 206. Next, at step 208, the recovered data is forwarded to data center 40. If a request for services is determined to be included in the recovered data at decisional step 210, then switch 36 forwards the request to service module 38 at step 212. Switch 36 receives a response from service module 38 at step 214. Next, at step 216, switch 36 sorts the data and any responses by destination node. Switch 36 then passes the sorted traffic to a buffer address associated with each destination node. Each block of data stored at a buffer address is associated with a header indicating a destination node at step 220. Switch 36 forwards the header and associated data to transmitter 28 for transmitting downstream traffic to all nodes 14 at a receiving wavelength. If node 12 determines that the downstream traffic violates a bandwidth threshold at decisional step 224, then optical network 10 is transitioned to transmitting a portion of the downstream traffic at a second receiving wavelength. Two embodiments of this transition step are illustrated in FIGS. 8 and 9. At step 228, data center node 12 transmits a portion of the downstream traffic at the second receiving wavelength such to at least one local node 14. (Note method repeats each time traffic is received.) FIG. 8 illustrates one embodiment of the transition step 226 illustrated in FIG. 7. The method begins at step 250 where node 12 determines what portion of the downstream traffic to transmit at a second receiving wavelength (due to the violation of the bandwidth threshold at step 224 of FIG. 7). For example, as described above with reference to FIG. 5, the downstream traffic to communicate on a second receiving wavelength (for example, $\lambda_{39}$) may be determined by transferring the transmission of downstream traffic from the first receiving wavelength (for example, $\lambda_{40}$) to $\lambda_{39}$ on a node-by-node basis (the node to which the traffic is destined) starting with the node having the smallest amount of associated downstream traffic, and then with the node having the next smallest associated amount of downstream traffic, etcetera, until the total downstream traffic transmitted on $\lambda_{40}$ is reduced below the operating threshold. In other embodiments, traffic could be transferred from $\lambda_{40}$ in any other suitable manner.

Once determined, node 12 instructs data center 40 to route that portion of the traffic to managing element 144 such that a portion of the traffic is transmitted at the OSC wavelength ($\lambda_{OSC}$) at step 252 for a transitional period of time. Next, at step 254, an additional transmitter 28 transmitting at the second receiving wavelength is installed at data center node 12 for transmitting the portion of the downstream traffic now being transmitted at $\lambda_{OSC}$. Additionally, at step 254, receiving elements are installed and/or adjusted at the local nodes associated with the portion of the downstream traffic. The receiving elements may include a tunable filter, a fixed optical filter, controller, switch, and receiver. If tunable filters are used at the local nodes, then a single filter can be used to receive different wavelengths (at different times). For example, a tunable filter not currently in use can be tuned to pass $\lambda_{39}$ once a receiver is installed or tuned to receive $\lambda_{39}$. Once the components are installed at step 256, an EMS 150 notifies NMS 152 of the added hardware and in response to this information, node 12 instructs data center 40 to route the portion of the downstream traffic to the transmitter 28 transmitting at wavelength $\lambda_{39}$ (instead of $\lambda_{OSC}$). This method can be repeated each time a newly added transmission wavelength violates its bandwidth threshold.

FIG. 9 illustrates another embodiment of transition step 226 in which initial downstream traffic is initially transmitted at $\lambda_{OSC}$. This method begins at step 260 where node 12 determines what traffic to transfer from $\lambda_{OSC}$ to a second receiving wavelength (for example, $\lambda_{40}$) due to the violation of the bandwidth threshold of $\lambda_{OSC}$ at step 224 of FIG. 7. For example, as described above with reference to FIG. 5, the downstream traffic to communicate on $\lambda_{40}$ may be determined by transferring the transmission of downstream traffic from $\lambda_{OSC}$ to $\lambda_{40}$ on a node-by-node basis (the node to which the traffic is destined) starting with the node having the largest amount of associated downstream traffic, and then with the node having the next largest associated amount of downstream traffic, etcetera, until the total downstream traffic transmitted on $\lambda_{OSC}$ is reduced below the operating threshold. In other embodiments, traffic could be transferred from $\lambda_{OSC}$ in any other suitable manner.

Next, at step 262, an additional transmitter transmitting at $\lambda_{40}$ is installed at data center node 12 and receiving elements are installed or adjusted at the associated local nodes. At step 264, an EMS 150 notifies node 12 of the added hardware and, in response to this information, node 12 instructs data center 40 to forward the associated traffic to transmitter 28 transmitting at $\lambda_{40}$ instead of transmitter transmitting $\lambda_{OSC}$.

Furthermore, although not illustrated explicitly in FIG. 9, if traffic transmitted at $\lambda_{40}$ violates a bandwidth threshold associated with transmitter 28, optical network 10 may proceed with the transitioning procedures described above for transitioning particular downstream traffic from $\lambda_{40}$ to wavelength $\lambda_{39}$ using the $\lambda_{OSC}$ as a temporary transmission wavelength (while a transmitter is installed at node 12 for $\lambda_{39}$). This process may require transitioning to $\lambda_{39}$ in stages if adding all traffic to be transitioned to $\lambda_{39}$ from $\lambda_{OSC}$ would violate the bandwidth threshold associated with $\lambda_{OSC}$. This method can be repeated each time a newly added transmission wavelength violates its bandwidth threshold.

Method 200 is described with respect to network 10 of FIG. 5, but method 200 could also be used by any other system. Moreover, network 10 may use any other suitable techniques for performing these tasks. Thus, many of the steps in this flow chart may take place simultaneously and/or in different orders as shown. Moreover, network 10 may use methods with additional steps, fewer steps, and/or different steps, so long as the methods remain appropriate.

Although the present invention has been described in detail, various changes and modifications may be suggested to one skilled in the art. It is intended that the present invention encompass such changes and modifications as falling within the scope of the appended claims.

What is claimed is:

1. An optical network, comprising:
   an optical ring;
   a plurality of local nodes coupled to the optical ring, the plurality of local nodes configured to receive traffic at a receiving wavelength;
   each local node configured to transmit traffic at an assigned transmitting wavelength, each local node having a different assigned transmitting wavelength, wherein the transmitting wavelengths are each transmitted at a bandwidth less than the receiving wavelength; and
   a data center node coupled to the optical ring and operable to receive traffic from the local nodes, sort at least some of the traffic based on the local node for which the traffic is destined, and transmit the traffic at the receiving wavelength to the local nodes;
   wherein the receiving wavelength comprises a first receiving wavelength, the data center node further operable to transmit traffic destined for at least one local node at a second receiving wavelength in response to the amount of traffic to be transmitted to the local nodes exceeding a bandwidth threshold; and
   wherein the data center node is further operable to transmit in an optical supervisory channel at least a portion of the traffic destined for the local nodes that exceeds the bandwidth threshold during a transition period before the traffic is transmitted in the second receiving wavelength.

2. The optical network of claim 1, wherein the data center node further comprises a service module, the service module operable to provide centralized storage applications, receive requests for data associated with the centralized storage applications from one or more local nodes, and provide the requested data to the local nodes.

3. The optical network of claim 2, wherein the requested data comprises audiovisual content.

4. The optical network of claim 1, wherein the traffic destined for local nodes is multiplexed and transmitted at the receiving wavelength and includes portions identified by headers, each local node further comprising a switch operable to communicate selected portions of the traffic to one or more local clients based on addressing information.

5. The optical network of claim 1, wherein the receiving wavelength is transmitted at 10 Gigabits per second (Gb/s) or more and the transmitting wavelengths are each transmitted at a bandwidth of 1 Gb/s or less.

6. The optical network of claim 1, wherein the plurality of local nodes are further operable to both pass through and drop traffic at the receiving wavelength without optical-to-electrical conversion.

7. The optical network of claim 1, wherein the plurality of local nodes are further operable to pass through traffic at the transmitting wavelengths without optical-to-electrical conversion.

8. A data center node, comprising:
   a plurality of receivers operable to receive traffic at a plurality of transmitting wavelengths, wherein each transmitting wavelength is assigned to a local node and different from transmitting wavelengths assigned to other local nodes;
   a data center operable to sort traffic based on the local node for which the traffic is destined; and
   a plurality of transmitters;
   wherein one or more of the plurality of transmitters are operable to transmit the traffic at a receiving wavelength to the local nodes, wherein each local node is configured to receive the receiving wavelength and the receiving wavelength is transmitted at a bandwidth greater than the transmitting wavelengths;
   wherein the receiving wavelength comprises a first receiving wavelength, one or more of the plurality of transmitters further operable to transmit traffic destined for at least one local node at a second receiving wavelength in response to the amount of traffic to be transmitted to the local nodes exceeding a bandwidth threshold; and
   wherein one or more of the plurality of transmitters are further operable to transmit in an optical supervisory channel at least a portion of the traffic destined for local nodes that exceeds the bandwidth threshold during a transition period before traffic is transmitted in the second receiving wavelength.

9. The data center node of claim 8, wherein the data center further comprises a service module, the service module operable to provide centralized storage applications, receive requests for data associated with the centralized storage applications from one or more local nodes, and provide the requested data to the local nodes.

10. The data center node of claim 9, wherein the requested data comprises audiovisual content.

11. The data center node of claim 8, wherein the traffic destined for local nodes is multiplexed and transmitted at the receiving wavelength and includes portions identified by headers, each local node further comprising a switch operable to communicate selected portions of the traffic to one or more local clients based on the headers.

12. The data center node of claim 8, wherein the receiving wavelength is transmitted at 10 Gigabits per second (Gb/s) or more and the transmitting wavelengths are each transmitted at a bandwidth of 1 Gb/s or less.

13. A method of transmitting traffic in an optical network, comprising:
receiving traffic at a plurality of transmitting wavelengths from a plurality of local nodes, wherein each transmitting wavelength is assigned to a local node and different from transmitting wavelengths assigned to other local nodes;
sorting the traffic based on the local node for which the traffic is destined; and
transmitting the traffic at a receiving wavelength, wherein each local node is configured to receive the receiving wavelength and the receiving wavelength is transmitted at a bandwidth greater than the transmitting wavelengths;
wherein the receiving wavelength comprises a first receiving wavelength, further comprising transmitting traffic destined for at least one local node at a second receiving wavelength in response to the amount of traffic to be transmitted to the local nodes exceeding a bandwidth threshold; and
further comprising transmitting in an optical supervisory channel at least a portion of the traffic destined for the local nodes that exceeds the bandwidth threshold during a transition period before the traffic is transmitted in the second receiving wavelength.

14. The method of claim 13, further comprising:
receiving requests for data associated with at least one centralized storage application from one or more local nodes; and
providing the requested data to the local nodes.

15. The method of claim 14, wherein the request data comprises audiovisual data.

16. The method of claim 13, wherein the traffic destined for local nodes is multiplexed and transmitted at the receiving wavelength and includes portions identified by addressing information, each local node further comprising a switch operable to communicate the portions of the traffic to one or more local clients based on the headers.

17. The method of claim 13, wherein the receiving wavelength is transmitted at 10 Gigabits per second (Gb/s) or more and the transmitting wavelengths are each transmitted at a bandwidth of 1 Gb/s or less.

18. A system for transmitting traffic in an optical network, comprising:
means for receiving traffic at a plurality of transmitting wavelengths from a plurality of local nodes, wherein each transmitting wavelength is assigned to a local node and different from transmitting wavelengths assigned to other local nodes;
means for sorting the traffic based on the local node for which the traffic is destined;
means for transmitting the traffic at a receiving wavelength, wherein each local node is operable to receive the receiving wavelength and the receiving wavelength is transmitted at a bandwidth greater than the transmitting wavelengths;
wherein the receiving wavelength comprises a first receiving wavelength, further comprising means for transmitting traffic destined for at least one local node at a second receiving wavelength in response to the amount of traffic to be transmitted to the local nodes exceeding a bandwidth threshold; and
further comprising means for transmitting in an optical supervisory channel at least a portion of the traffic destined for the local nodes that exceeds the bandwidth threshold during a transition period before the traffic is transmitted in the second receiving wavelength.

19. The system of claim 18, further comprising:
means for receiving requests for data associated with at least one centralized storage application from one or more local nodes; and
means for providing the requested data to the local nodes.

20. A data center node, comprising:
a plurality of receivers operable to receive traffic at a plurality of transmitting wavelengths, wherein each transmitting wavelength is assigned to a local node and different from transmitting wavelengths assigned to other local nodes;
a data center operable to sort traffic based on the local node for which the traffic is destined, provide centralized storage applications through a service module, receive requests for audiovisual content associated with the centralized storage applications from one or more local nodes, and provide the requested audiovisual content to the local nodes;
a first transmitter operable to transmit the traffic at a first receiving wavelength having a greater bandwidth than the transmitting wavelengths, wherein each local node is configured to receive the receiving wavelength;
a second transmitter operable to transmit traffic associated with at least one local node at a second receiving wavelength in response to traffic transmitted at the first receiving wavelength exceeding a bandwidth threshold; and
a third transmitter operable to transmit in an optical supervisory channel at least a portion of the traffic associated with at least one local node that exceeds the bandwidth threshold during a transition period before the traffic is transmitted in the second receiving wavelength.

* * * * *

UNITED STATES PATENT AND TRADEMARK OFFICE
CERTIFICATE OF CORRECTION

| | |
|---|---|
| PATENT NO. | : 7,603,035 B2 |
| APPLICATION NO. | : 10/933552 |
| DATED | : October 13, 2009 |
| INVENTOR(S) | : Susumu Kinoshita et al. |

It is certified that error appears in the above-identified patent and that said Letters Patent is hereby corrected as shown below:

Column 18, Lines 37-38, Claim 8, after "for which the traffic is destined; and" delete "a plurality of" and insert -- one or more --.

Signed and Sealed this

Fourteenth Day of September, 2010

David J. Kappos
*Director of the United States Patent and Trademark Office*